May 17, 1927.
B. JASSEN
1,629,458
AUTOMOBILE MIRROR
Filed Nov. 3, 1923
2 Sheets-Sheet 1
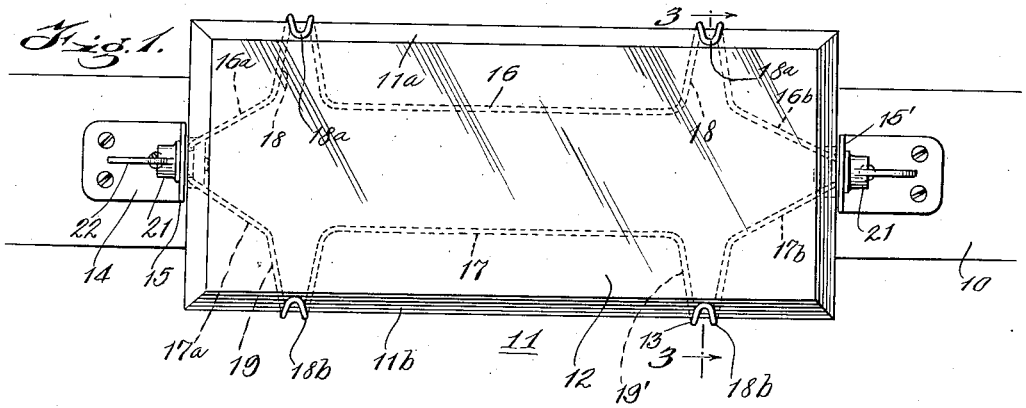
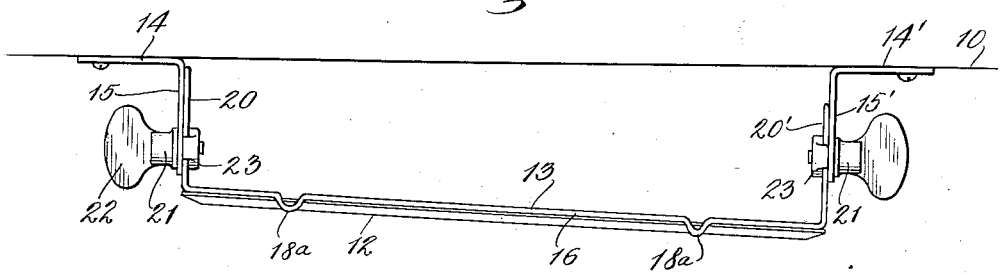
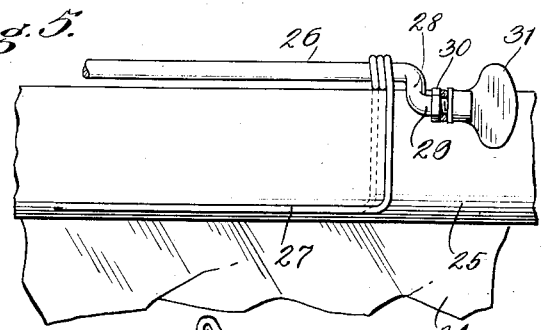
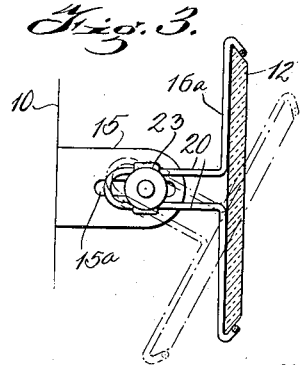
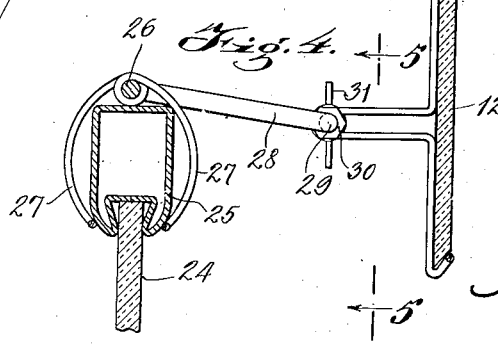
INVENTOR
BERN JASSEN
BY
Lloyd W. Patch
ATTORNEY May 17, 1927. 1,629,458
B. JASSEN
AUTOMOBILE MIRROR
Filed Nov. 3, 1923   2 Sheets-Sheet 2
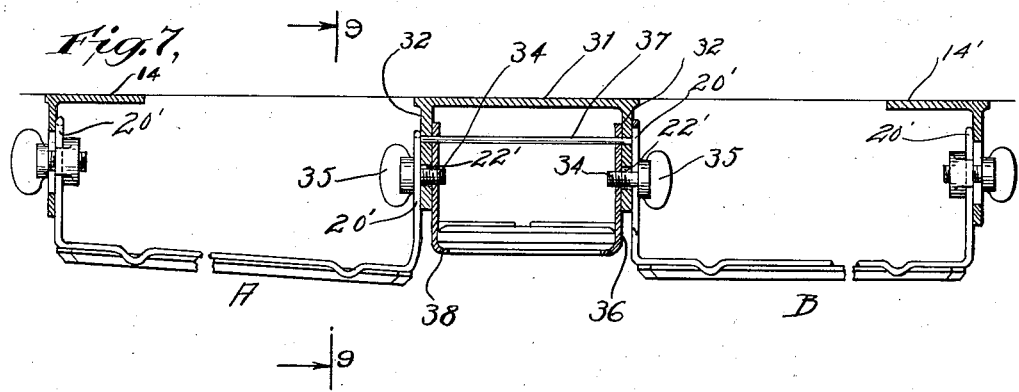
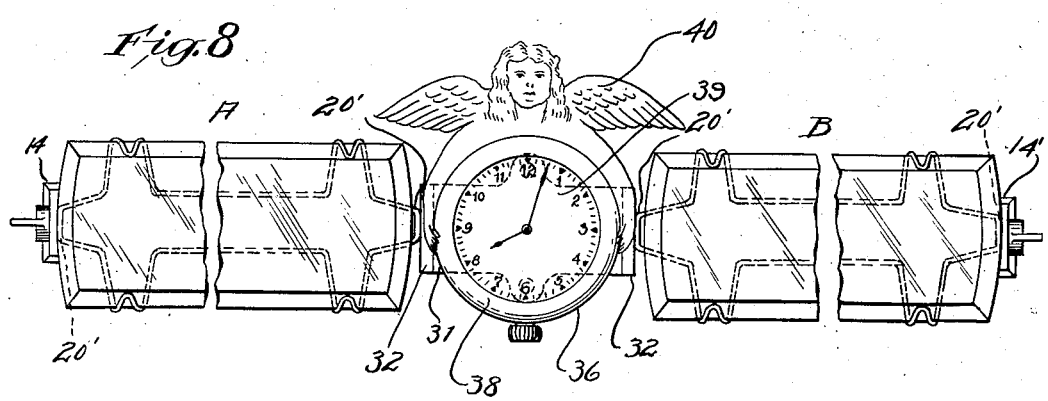
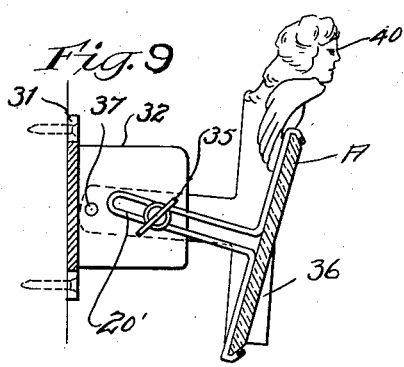
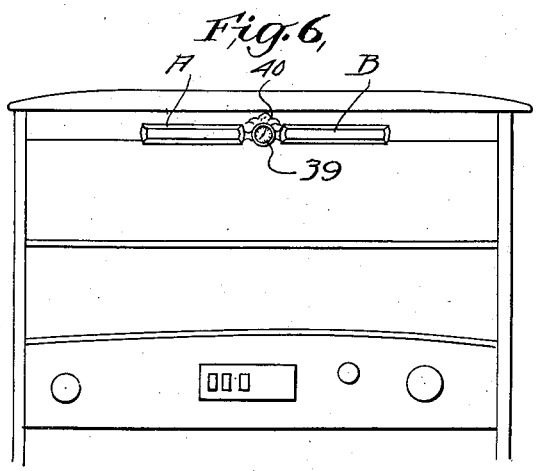
INVENTOR
BERN JASSEN
BY
Lloyd W. Patch
ATTORNEY Patented May 17, 1927.

1,629,458

UNITED STATES PATENT OFFICE.

BERN JASSEN, OF BROOKLYN, NEW YORK.

AUTOMOBILE MIRROR.

Application filed November 3, 1923. Serial No. 672,523.

This invention relates to automobile mirrors. More particularly, it is directed to an adjustable mirror or arrangement of mirrors adapted to be positioned on the wind-shield in front of the driver.

One object of the invention is to provide a device of the character described which shall be capable of adjustment both as to direction and range so as to enable the device to be used for direct rear reflection, or for side reflection, or both, whereby the operator may be aware of the road conditions both to the rear and side of the machine, and for any desired distance within practical limits.

Another object is to provide an arrangement of mirrors for the purpose described adapted to be adjusted so as to reflect different portions of the road, and arranged so as to afford separate and distinct vision of separate portions of the road.

A further object is to provide a mirror frame of the character and for the purpose described, which shall be simple in construction, comparatively cheap to manufacture, and efficient in operation to a high degree.

Other objects of this invention will in part be obvious and in part hereinafter pointed out.

The invention accordingly consists in the features of construction, combinations of elements and arrangement of parts which will be exemplified in the construction hereinafter described, and of which the scope of application will be indicated in the following claims.

In the accompanying drawings, in which is shown one of the various possible illustrative embodiments of this invention, Fig. 1 is a front elevational view of an embodiment of the invention;

Fig. 2 is a plan view thereof;

Fig. 3 is an end cross-sectional view taken along line 3—3 of Fig. 1 showing the adjustable supporting means;

Fig. 4 is an end elevational view in cross-section of a modified embodiment of the invention;

Fig. 5 is a front elevational section of the modification taken along line 5—5 of Fig. 4;

Fig. 6 is a view showing the dash-board and wind shield with two mirrors embodying the invention mounted on the latter;

Fig. 7 is a plan view showing two mirrors embodying the invention adjusted at different angles;

Fig. 8 is a vertical elevation corresponding to Fig. 7; and

Fig. 9 is an end cross-sectional view taken along line 9—9 of Fig. 7.

Referring in detail to the drawing, 10 indicates a support such as the wind-shield on which is positioned my new mirror device indicated generally at 11. The latter comprises a mirror 12, held in a frame 13. Secured to the support is a pair of spaced brackets 14, 14' having a lug portion 15, 15' each provided with a slot $15^a$.

The mirror frame is preferably made from wire bent so as to provide support portions 16, $16^a$, and $16^b$, 17, $17^a$, $17^b$ extending over the rear face of the mirror. Loops 18, 18' and 19, 19' are bent from the wire and adapted to extend transversely of the rear face of the mirror and have overturned ends $18^a$, $18^b$ respectively, extending over the upper and lower edges $11^a$, $11^b$ of the mirror, so as to provide holding clips therefor. The wire of the mirror frame is preferably of spring or resilient material so that these holding clips will grip the edges of the mirror by the spring action of the material, as will be readily understood. The edges of the mirror may be beveled as shown in the drawing. The wire is further bent at the ends of the portions $16^a$, $17^a$, and $16^b$, $18^b$ respectively, so as to provide end loops 20' extending transversely toward the support so as to overlie the lugs 15, 15'. A bolt 21 having a head 22, is provided for each of the brackets 14, 14', and extends through the slot $15^a$ and the corresponding loop 20 and 20' and a nut 23 is threaded on said bolt for securing the frame to the brackets 14, 14' in any adjusted position.

It will be clear from this construction that the mirror may be moved toward and away from the wind-shield or support 10 by sliding the loops 20 or 20' over the bolts 21 and the mirror may in this way be adjusted to any angle relative to the support 10 by varying the degree to which the loops 20 and 20' are moved toward or away from the support. The mirror may further be rotated about a horizontal axis and secured in rotated adjusted position as shown in Fig. 3. In this way a large degree of adjustment is provided, the mirror being adjustable so as to be parallel to the dashboard to reflect the road conditions directly to the rear of the car, or at an incline as shown in Fig. 2 to reflect road conditions at the side of the car, and may be further adjusted so as to give the desired reflection when the wind-shield is adjusted in various positions.

In Figs. 6, 7, 8 and 9, I show how two mirrors and mirror frames A and B, made in accordance with the invention may be employed on the wind shield so as to enable the operator to obtain straight rear reflection and also side reflection. To this end the mirror frames have each one end thereof secured to the brackets 14, 14' and the other ends secured to an intermediate support 31 having the upstanding lug members 32 provided with openings 22 for the screws or bolts 34. The latter are provided with wing heads 35 which may be turned in proper relation to the loops 20' so as to maintain the mirror frame in desired adjustment relative to the supports 31, as shown for example in Fig. 9. A frame 36 is pivotally supported between the lug members 32 by means of a pivot pin 37. This frame has a bezel 38 for a clock or other indicator 39 which may be provided with a suitable decoration such as shown at 40. For the purpose of illustration, I have shown mirror A inclined so as to give side road-way reflection, while mirror B is parallel to the dashboard so as to give direct rear reflection. The two mirrors A and B are spaced from each other by the support 31, and the line of vision is further broken up by the intermediate frame carrying the indicator 39, thus enabling the operator to get separate and distinct vision reflecting the rear and side of the road, and enabling him to concentrate definitely on whatever portion of the road the mirrors are adjusted to reflect.

It will thus be seen that there is provided a device in which the several objects of this invention are achieved and which is well adapted to meet the conditions of practical use.

As various possible embodiments might be made in the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. A device of the character described comprising a supporting member, mirrors carried by said member, and means associated with said member for mounting said mirrors whereby each can be independently adjusted with respect to the other on substantially vertical and horizontal axes.

2. An automobile rear-view mirror comprising a supporting member to be mounted upon an automobile and having supporting arms, a pair of mirrors carried by said arms to both be within the field of vision of the operator of the automobile, and means associated with said arms for movably mounting said mirrors whereby each mirror can be independently adjusted with respect to the other on substantially vertical and horizontal axes so as to afford selective and separate views of different portions of the road.

3. An automobile rear-view mirror comprising a supporting bracket structure, a pair of mirrors, and means associated with said supporting bracket structure for mounting said mirrors adjustably thereon whereby each can be independently adjusted with respect to the other upon two intersecting axes.

4. In an automobile mirror, a mounting having pairs of spaced supports with the adjacent ends of said pairs of supports forming an intermediate support, a mirror adjustably carried by each of the first mentioned pairs of supports, and an indicator carried by the intermediate support between said mirrors to break up the line of vision.

5. An automobile mirror comprising a bracket structure adapted to be secured on an automobile, supports on said bracket structure spaced a substantial distance apart, two mirrors carried by said supports in spaced relation for independent angular adjustment, and an instrument carried by adjacent portions of said supports between said mirrors to break up the line of vision as and for the purpose described.

6. A device of the character described comprising a bracket structure adapted to be secured upon an automobile, supports on said bracket structure, a pair of mirrors mounted a substantial distance apart on said supports, adjusting means at the ends of each mirror to allow displacement of the ends of the mirror in and out with respect to the bracket structure and to permit adjustment of the mirror to various angular positions, and means on the adjacent ends of the mirror supports adapted to carry an indicator in the spacing distance to break up the line of vision as the mirrors are viewed.

7. An automobile mirror of the character described comprising in combination, a supporting mounting, a pair of mirrors carried by said mounting and spaced a substantial distance apart, means associated with the supporting mounting whereby said mirrors are mounted for adjustment to various angular positions both vertically and horizontally with respect to each other, and an instrument adjustably carried by the supporting mounting in the space between the mirrors to break up the line of vision.

8. A device of the character described comprising, in combination a supporting mounting having extending arms, a mirror carried by said arms, and an indicator carried by the arms at one side of the mirror to be within the field of vision as the mirror is viewed.

9. An automobile device of the class described comprising in combination, a supporting bracket having three arms extending therefrom, a mirror carried by two adjacent arms, and an instrument carried by the remaining arm and an adjacent mirror carrying arm.

10. An automobile mirror comprising a supporting member having two pairs of arms extending therefrom, a pair of mirrors, and means associated with said mirrors whereby each mirror is mounted upon a pair of arms to be independently adjustable with respect to the other mirror upon two intersecting axes.

11. An automobile mirror comprising a supporting member having a plurality of slotted arms extending therefrom, a pair of mirrors, slotted supporting brackets associated with the mirrors, and means associated with the slotted arms and slotted supporting brackets to adjustably mount the mirrors to be carried by said supporting member whereby each mirror can be independently adjusted with respect to the other upon two intersecting axes.

12. An automobile mirror comprising a supporting bracket having a plurality of slotted arms extending therefrom, a pair of mirrors, supporting brackets associated with the mirrors, an instrument case, and means associated with the slotted supporting arms and the supporting brackets to adjustably mount the mirrors to be carried by the supporting member, certain of the last named means serving to mount the instrument case in a position intermediate said mirrors.

13. An automobile rear view mirror comprising a supporting structure formed to be substantially U-shaped and having arms extending therefrom, a plurality of mirrors, and means associated with said arms to movably mount each mirror to be independently adjustable with respect to the other mirror upon two intersecting axes.

14. An automobile mirror comprising a supporting member having a plurality of slotted arms extending therefrom, a plurality of mirrors, and means associated with the slotted arms to adjustably mount the mirrors to be independently adjustable upon two intersecting axes each with respect to the other mirror.

In testimony whereof I affix my signature.

BERN JASSEN.